(12) United States Patent
Martin (10) Patent No.: US 10,044,932 B2
(45) Date of Patent: Aug. 7, 2018

(54) WIDE ANGLE FISHEYE SECURITY CAMERA HAVING OFFSET LENS AND IMAGE SENSOR

(71) Applicant: Sensormatic Electronics, LLC, Boca Raton, FL (US)

(72) Inventor: Walter A. Martin, Ballymena (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 210 days.

(21) Appl. No.: 14/683,342

(22) Filed: Apr. 10, 2015

(65) Prior Publication Data
US 2016/0269629 A1    Sep. 15, 2016

Related U.S. Application Data

(60) Provisional application No. 62/132,602, filed on Mar. 13, 2015.

(51) Int. Cl.
| | |
|---|---|
| *H04N 7/18* | (2006.01) |
| *H04N 5/232* | (2006.01) |
| *H04N 5/225* | (2006.01) |
| *G08B 13/196* | (2006.01) |

(52) U.S. Cl.
CPC ... *H04N 5/23238* (2013.01); *G08B 13/19617* (2013.01); *G08B 13/19628* (2013.01); *H04N 5/2253* (2013.01); *H04N 5/2259* (2013.01); *H04N 7/183* (2013.01)

(58) Field of Classification Search
CPC ................................................. H04N 5/23238
See application file for complete search history.

(56) References Cited

U.S. PATENT DOCUMENTS

| | | | | |
|---|---|---|---|---|
| 2005/0139750 A1* | 6/2005 | Dobashi | ............ | H01L 27/14621 |
| | | | | 250/208.1 |
| 2010/0282950 A1* | 11/2010 | Smith | ...................... | G02B 3/02 |
| | | | | 250/221 |
| 2013/0162868 A1* | 6/2013 | Watanabe | ............... | H04N 5/262 |
| | | | | 348/240.3 |
| 2013/0170029 A1* | 7/2013 | Morita | ................... | G02B 27/22 |
| | | | | 359/464 |
| 2013/0272690 A1* | 10/2013 | Aoki | ...................... | G03B 7/095 |
| | | | | 396/257 |
| 2016/0021309 A1* | 1/2016 | Wu | ........................ | G03B 17/00 |
| | | | | 348/143 |

* cited by examiner

*Primary Examiner* — Tracy Y Li
(74) *Attorney, Agent, or Firm* — HoustonHogle LLP (57) ABSTRACT

A wide angle, e.g., fisheye, surveillance, e.g., security, camera comprises an offsetting mechanism for offsetting a center of the image sensor relative to an optical axis of the fisheye lens system. Often when fisheye cameras are wall mounted a substantial area of the image may be dedicated to looking at sky or ceiling. A similar situation can arise when a fisheye camera is ceiling mounted next to a wall or other structure. Portions of the image will be unchanging and of little value for surveillance. The camera provides the capability to offset the lens system relative to the image sensor. In examples, this offset is performed as a factory manufacture or calibration step. In other examples, the offset is performed as an adjustment in the field at the time of installation or thereafter.

21 Claims, 8 Drawing Sheets

WIDE ANGLE FISHEYE SECURITY CAMERA HAVING OFFSET LENS AND IMAGE SENSOR

RELATED APPLICATIONS

This application claims the benefit under 35 U.S.C. § 119(e) of U.S. Provisional Application No. 62/132,602, filed on Mar. 13, 2015, which is incorporated herein by reference in its entirety.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, roads and highways, and town and city centers.

These video security systems typically include surveillance, e.g., security, cameras that connect via a security network to a control system. Additional components include network video recorder (NVR) systems and monitors for displaying images such as video from the security cameras.

The security cameras typically have a lens and image sensor that are fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

Fixed security cameras often have wide angle lens systems to compensate for their inability to be aimed. An extreme example of a wide angle camera is a fisheye camera. The fisheye security camera uses an ultra-wide-angle fisheye lens to form an image on the image sensor.

The fisheye security cameras are typically used in situations in which there is a need to capture a wide field of view in a single image. They also tend to be more mechanically robust than adjustable cameras. The fisheye security cameras provide this wide field of view by utilizing the fisheye lens to provide, for example, between 180 degrees and 360 degrees of surveillance range. Due to the wide field of view, the raw image captured by the imager chip is distorted, however.

The installation process of a fixed security camera (e.g., fisheye security camera) in a video security system involves several steps. An installer mounts the fisheye security camera at a desired location that allows for the fisheye security camera to capture a wide area of interest. For example, the fisheye security cameras are typically installed in a wall mode orientation or ceiling mode orientation. In the wall mode orientation, the optical axis of the camera's lens system extends in a horizontal direction. This is common when the fisheye security camera is installed on a wall of a building or room. In the ceiling mode orientation, the optical axis of the camera's lens system extends in a vertical direction. This is common when the fisheye security camera is installed on a ceiling of a room or hallway or on a mounting arm extending from a building, lamppost or other structure. In either mode, the camera should usually be leveled to ensure good image orientation. Then, the installer will usually program the video security system with the fixed security camera's orientation.

In general, there is distortion processing software to correct a distorted or warped image by de-warping the image. In particular, this distortion processing software uses image processing algorithms or models corresponding to the lens being used (e.g., fisheye lens) and information on the camera's orientation mode to correct and rotate the distorted image.

SUMMARY OF THE INVENTION

When a wide angle or fisheye camera is mounted in the wall mode orientation, a substantial area of the image may be dedicated to looking at sky, if outdoor mounted, or the ceiling, if indoor mounted. A similar situation can arise when a fisheye camera is mounted in the ceiling mode orientation and located next to a wall or other structure. Thus, here also, portions of the image will be unchanging and of little value for surveillance. These portions of the captured image are unlikely to have any surveillance or security value and are often thus deemed to be "uninteresting."

At the same time, the typical wide angle or fisheye camera has an image "sweet spot". The image distortion generated by the wide angle lens means optical resolution varies across the image. In some systems, optical resolution drops off dramatically being just over half the center resolution 66% across the lens and down to 40% at a point 80% across the lens.

The present invention concerns modifying the standard wide angle, e.g., fisheye, camera so that it is better adapted or can be adapted to the particular situation in which it is installed. The regions of the image that are deemed uninteresting are reduced and/or the camera sweet spot is better directed to the regions of the image that are deemed to have the most value.

This is accomplished by allowing the lens to be offset relative to the image sensor. In examples, this offset is performed as a factory manufacturing or calibration step. On other examples, the offset is performed as an adjustment in the field at the time of installation or thereafter.

In general according to one aspect, the invention concerns a wide angle, e.g., fisheye, surveillance camera comprising an image sensor for detecting images, a wide angle lens system for forming images on the image sensor, and an offsetting mechanism for offsetting a center of the image sensor relative to an optical axis of the wide angle lens system.

Typically, an area of a projected aperture of the wide angle lens system at the plane of the image sensor is larger than an area of the image sensor. For example, an area of a projected aperture of the wide angle lens system at the plane of the image sensor is 50% or 100% larger than an area of the image sensor. This provides leeway to adjust the sensor relative to the lens.

In one embodiment, the offsetting mechanism offsets the center of the image sensor relative to an optical axis of the fisheye lens system along only one axis. However, in other embodiments, the offsetting mechanism offsets the center of the image sensor relative to an optical axis of the wide angle lens system along both axes of the plane of the image sensor, using a two dimensional stage, for example.

In some implementations, the offsetting mechanism has the capability to offset the center of the image sensor relative to an optical axis of the wide angle lens system by a distance that is greater than 10% length of the image sensor. In other cases, the sensor offsetting mechanism has the capability to offset the center of the image sensor relative to an optical axis of the wide angle lens system by a distance that is greater than 20% or even 50% of the length of the image sensor. The sensor offsetting mechanism may even have the capability to offset the center of the image sensor relative to an optical axis of the wide angle lens system by a distance that is greater than 20% or even 50% of the length of the image sensor along both axes of the plane of the image sensor.

In some cases, the system is field adjustable. For example, the offsetting mechanism can comprise an adjustment screw, for example, that is accessible from an exterior of a body of the camera.

In other cases, the system may be factory configurable. Here, an indicium, which is visible on the camera and which indicates a direction that the image sensor is offset with respect to the fisheye lens system, is helpful.

In general according to another aspect, the invention features a method for installing a wide angle surveillance camera. This method comprises installing the camera, and offsetting a center of the image sensor relative to an optical axis of the wide angle lens system to reduce uninteresting portions within images generated by the camera.

In general, according to still another aspect, the invention features method for installing a wide angle surveillance camera. This method comprises installing the camera and adjusting a body offset direction indicia indicating direction that image sensor is offset to reduce uninteresting portions within images generated by the camera.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
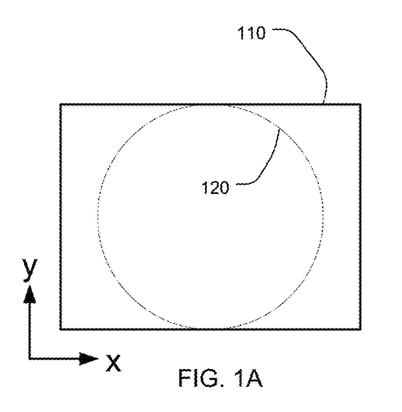
FIGS. 1A and 1B show the relationship between the image sensor and the projected lens system aperture at the image sensor plane for a traditional full fisheye and a full frame fisheye, respectively.
Figure 1B:
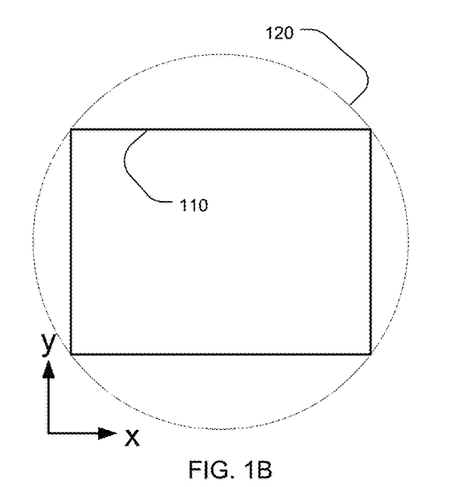

FIGS. 1A and 1B show the relationship between the image sensor and the projected lens system aperture at the image sensor plane.

FIG. 1A illustrates the relationship for a traditional full fisheye. In this configuration, a relatively large portion of the image sensor 110 is unused since the lens system projected aperture 120 fits entirely within the area of the image sensor 110.

FIG. 1B illustrates the relationship for a traditional full frame fisheye. Here, the lens system is designed relative to the placement of the image sensor 110 so that the area of the image sensor fits within the projected aperture 120 of the lens system. The advantage of this system is that it more fully utilizes the area of the image sensor at the expense of not being able to detect the full image formed by the lens system. In general, in this configuration, the area of the image sensor detects or covers about 80% of the projected aperture.

Figure 2:
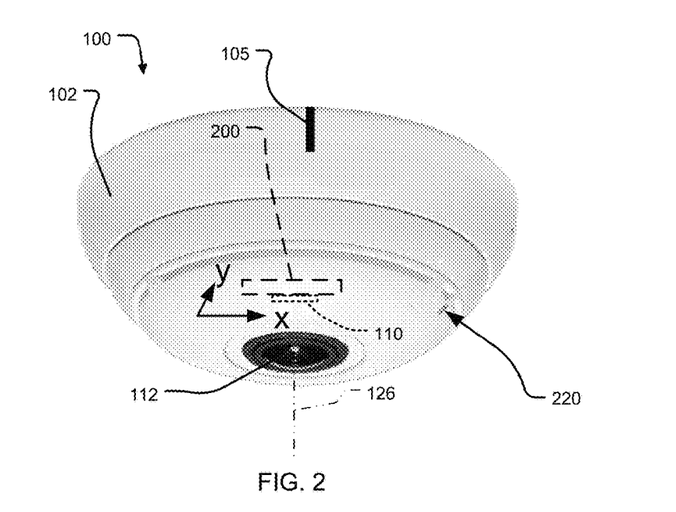
FIG. 2 is a perspective schematic view of a fisheye security camera including an image sensor offsetting system.

FIG. 2 shows a fisheye surveillance, e.g., security, camera 100 including an image sensor offsetting system 200 for the image sensor 110.

In general, the fisheye camera 100 comprises a camera body 102. The fisheye lens system 112 is held by this camera body and collects light from the surrounding environment to form an image on the internal image sensor 110.

In the illustrated embodiment, the image sensor 110 is held by an image sensor offsetting system 200. This is internal to the body 102 and has the capability of moving the center of the image sensor 110 relative to the optical axis 126 of the fisheye lens system 112.

In the illustrated implementation, offset adjustment screw 220 is provided. This allows for the adjustment of the image sensor offsetting system 200. This adjustment is accessible from the exterior of the camera body 102 so that it can be changed by an installer or at the time of its manufacture, for example.

According to another aspect, a body offset direction indicium or indicia 105 are also included. This indicium indicates direction that image sensor is offset. As result, if the offsetting mechanism is configured in the factory, indicia are used so that the installer knows the direction in which the image sensor has been offset relative to the fisheye lens system 112. As result, the installer will use this indicia to rotationally align the body 102 of the fisheye security camera 110 so that the indicium is aligned with an uninteresting direction or adjacent to structure (sky or wall), for example.

Figure 3:
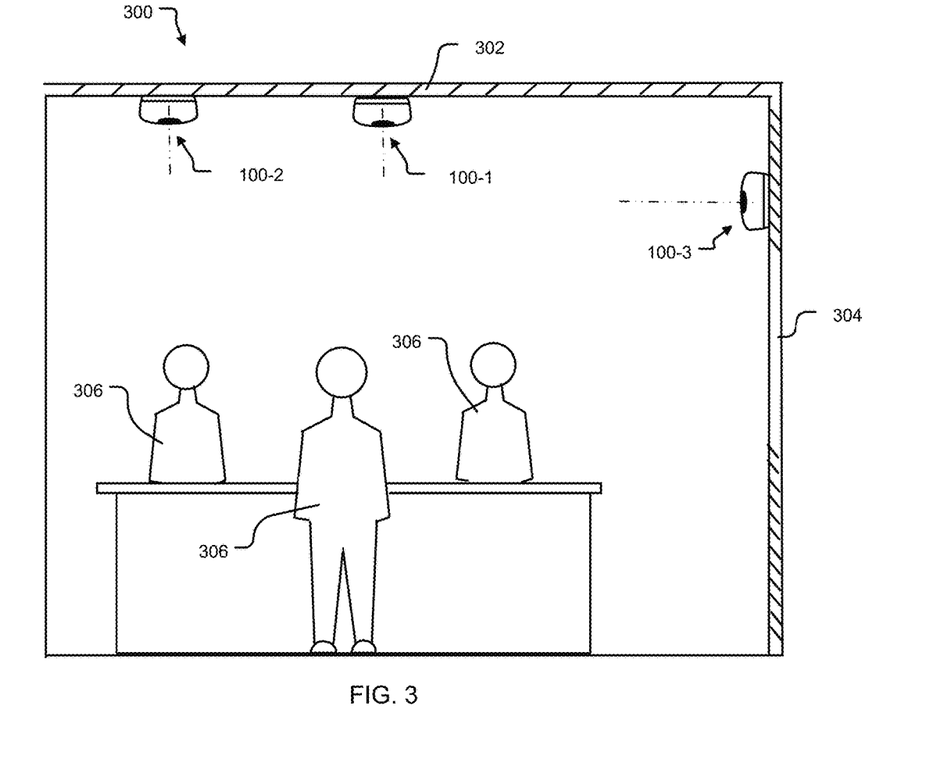
FIG. 3 is a plan schematic view of a room or hallway with fisheye security cameras installed at various locations.

FIG. 3 illustrates an exemplary room or hallway 300 with installed wide angle surveillance cameras 100 (e.g., fisheye security cameras). The security cameras 100 are installed in different orientations for monitoring the room or hallway 300 and individuals 306 in the room or hallway 300. The security cameras 100-1, 100-2 are mounted to the ceiling 302, ceiling mode orientation. Security camera 100-3 is mounted to the wall 304, wall mode orientation.

These different mounting positions illustrate how fisheye surveillance cameras may be installed such that they capture uninteresting portions of the image. For example, security camera 100-1, being located in the center of the ceiling 103 probably has few uninteresting or stationary portions of its captured image. In contrast, security camera 100-2 is located adjacent to a wall. As a result, large portions of its image will be uninteresting. In a similar situation, security camera 100-3 is installed on a vertically extending wall 104. Therefore, it will "see" the ceiling which is probably uninteresting from a surveillance standpoint.

Figure 4:
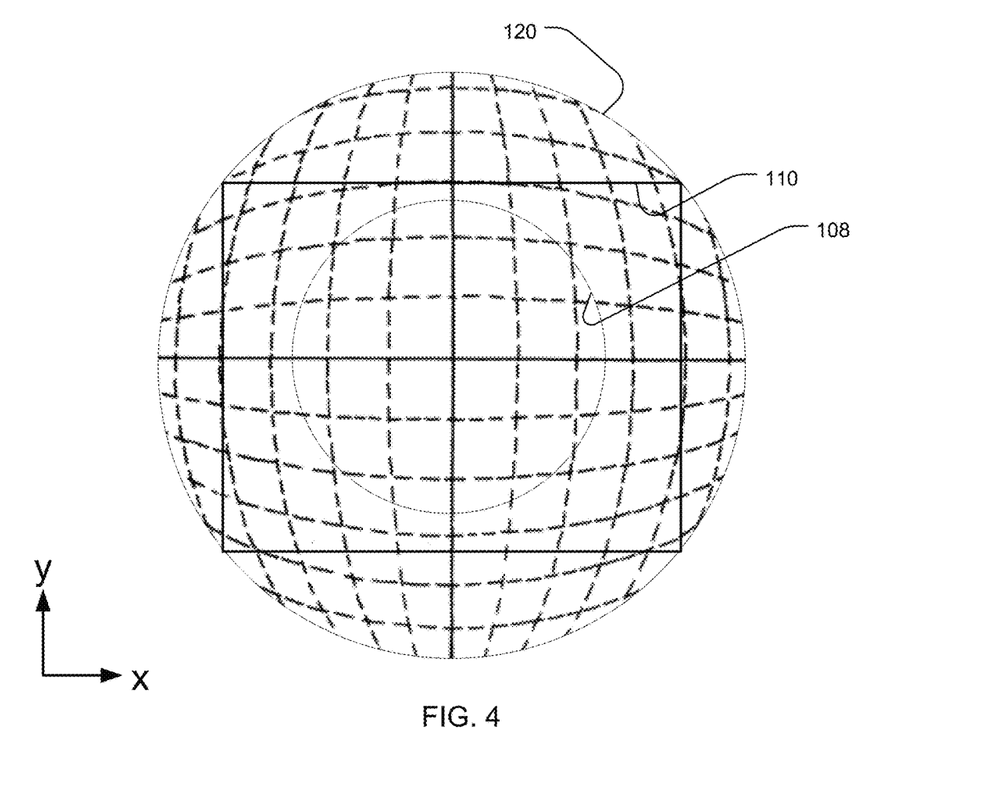
FIG. 4 shows the relationship between the image sensor and the projected lens system aperture at the image sensor plane along with a distortion profile of the fisheye lens system.

FIG. 4 shows the relationship between the image sensor 110 and the projected lens system aperture 120 at the image sensor plane.

Also shown is the distortion profile of the fisheye lens system. Due to this distortion effect from the wide angle fisheye lens, there is a resulting high accuracy or resolution region 108 of fisheye lens system. This corresponds to the lens's sweet spot.

According to the invention, the relationship between the projected aperture 120 and specifically this sweet spot 108 is adjusted relative to the extent of the image sensor 110 in order to optimize the relationship between these areas and the specific image that is collected by the lens system 112.

Figure 5:
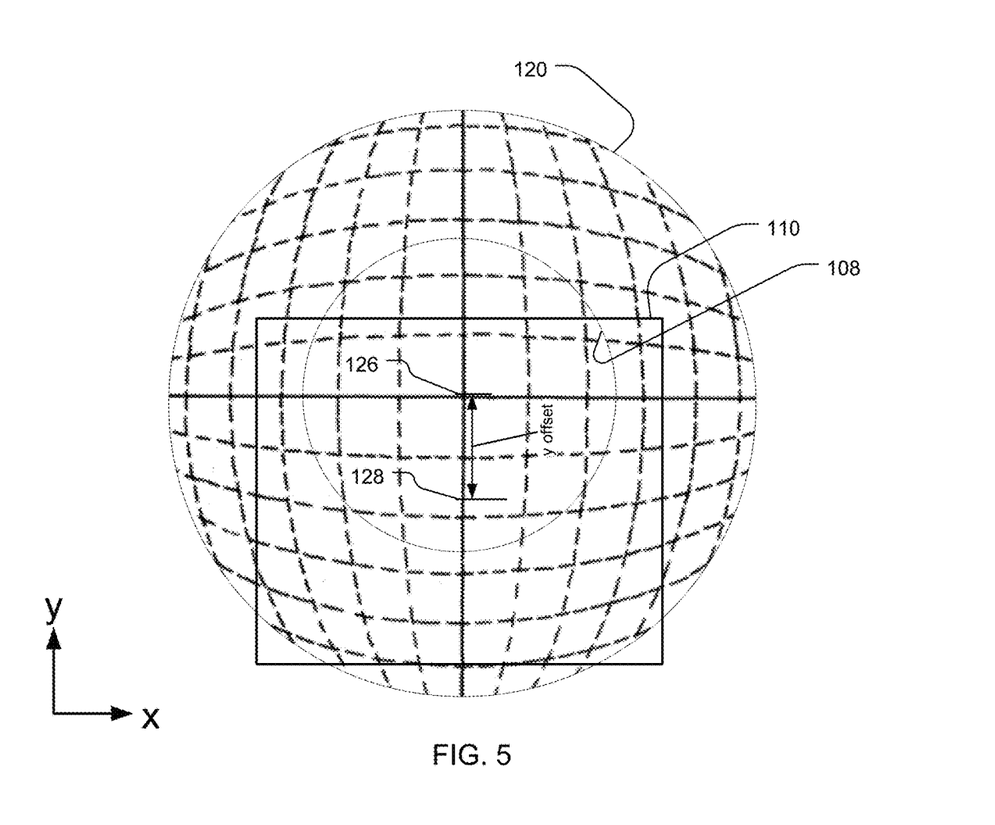
FIG. 5 shows the relationship between the image sensor and the projected lens system aperture with an image sensor offset relative to the optical axis of the fisheye lens optical system according to the present invention.

FIG. 5 shows the relationship between the image sensor 110 and the projected lens system aperture 120. Here, the image sensor 110, and specifically its center 128, is offset relative to the optical axis 126 of the fisheye lens optical system 112.

Typically, the offsetting mechanism has the capability to offset the center 128 of the image sensor 110 relative to the optical axis 126 of the fisheye lens system 112 by a distance (y offset) that is greater than 10% length of the image sensor.

In the illustrated example, the center 128 of the image sensor 110 is offset relative to an optical axis 126 of the projected aperture/fisheye lens system 120, 112 by a distance (y offset) that is about 20% or greater than the length of the image sensor 110 along the direction of offset.

Of note in the illustrated embodiment, the image sensor 110 is offset in only one direction in the two-dimensional plane of the image sensor 110. Specifically, it is offset in the negative y-axis direction.

Figure 6:
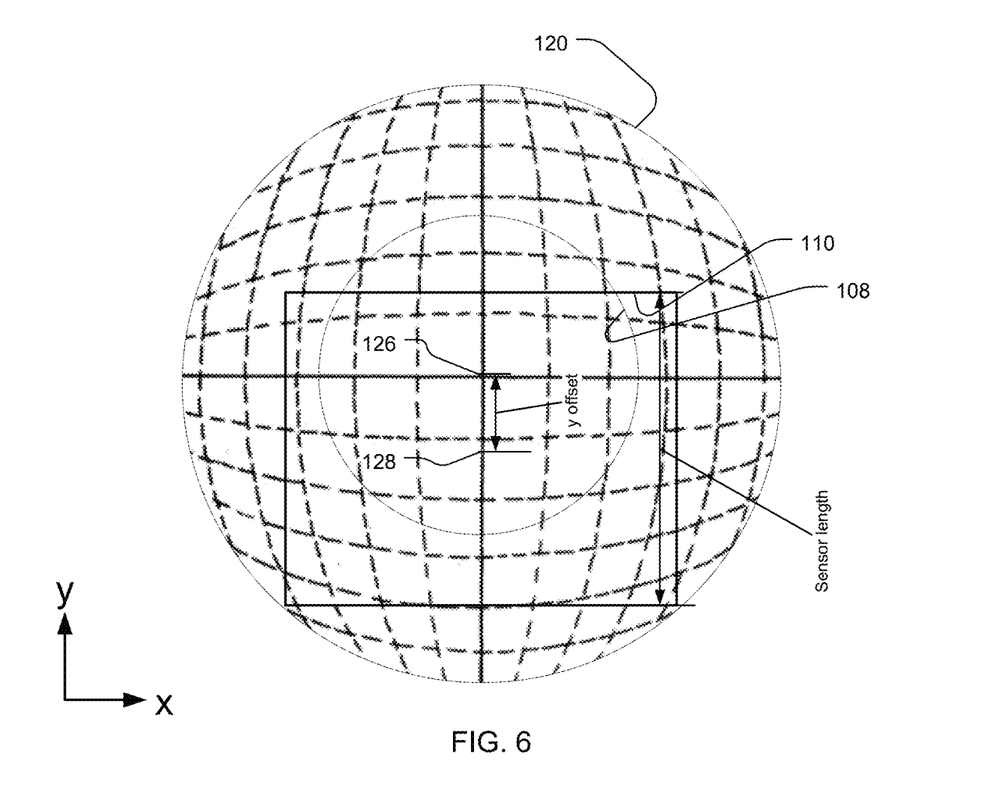
FIG. 6 shows the relationship between the image sensor and the projected lens system aperture with an image sensor offset relative to the optical axis of the fisheye lens optical system according still another embodiment in which the projected lens system aperture is large relative to the image sensor at the sensor plane.

FIG. 6 shows the relationship between the image sensor 110 and the projected lens system aperture 120. In this example, the projected lens system aperture is large relative to the image sensor at the sensor plane. That is, this embodiment is a variant of the traditional full frame fisheye in which the frame is much smaller than projected aperture 120. Generally, an area of a projected aperture 120 of the fisheye lens system at the plane of the image sensor 110 is 50% larger than an area of the image sensor 110. In other embodiments, area of the projected aperture 120 of the fisheye lens system 112 at the plane of the image sensor 110 is 100% larger than an area of the image sensor 110.

The advantages of these configurations is that there is more leeway in which to adjust the image sensor 110 and specifically adjust the image sensor relative to the lens's sweet spot 108 to ensure that the image sensor is maximizing the interesting portions of the captured image.

Figure 7:
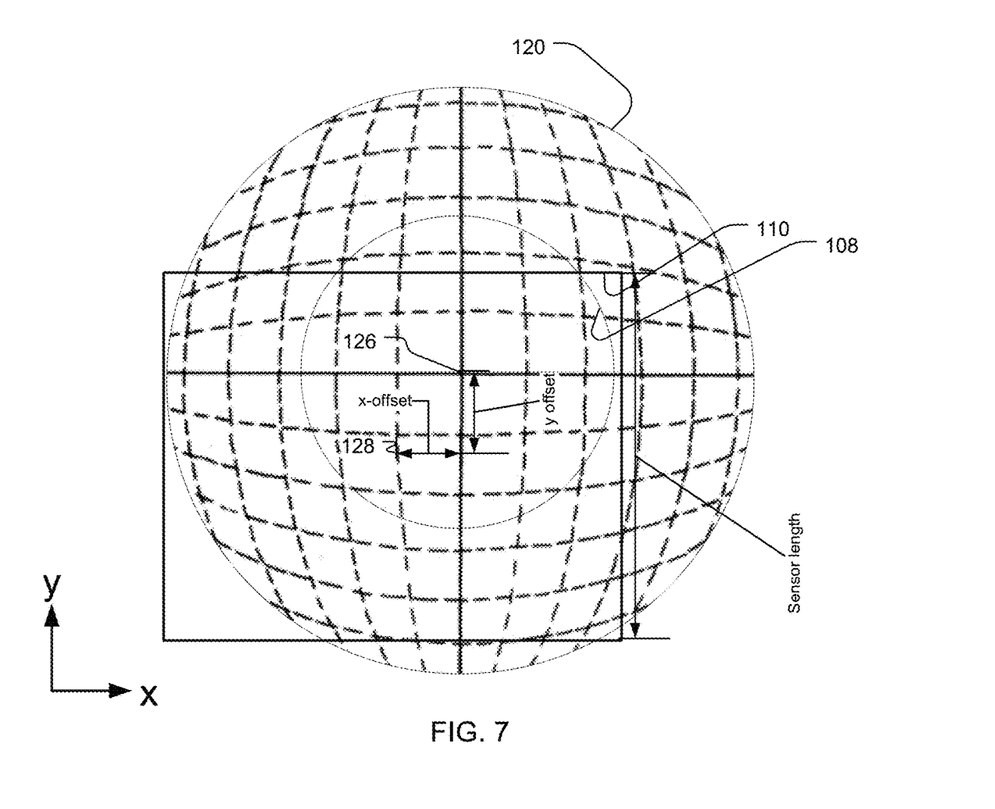
FIG. 7 shows the relationship between the image sensor and the projected lens system aperture with an image sensor offset along two axes relative to the optical axis of the fisheye lens optical system according still another embodiment.

FIG. 7 shows the relationship between the image sensor 110 and the projected lens system aperture 120 according to another embodiment. In this example, the image sensor 110 is offset along two axes (in the plane of the sensor 110), relative to the optical axis 126 of the fisheye lens optical system 112 and specifically its projected aperture 120.

Specifically in the illustrated embodiment, the image sensor 110 is shifted in the negative y-axis direction and the negative x-axis direction. Although in other embodiments, it is shifted in either the positive y-axis direction or the positive x-axis direction. In general, this shift is either performed as an initial factory calibration or it is performed in the field by the operator in order to minimize the uninteresting portions of the image that are captured by the image sensor 110.

Typically, the offsetting mechanism has the capability to offset the center 128 of the image sensor 110 relative to the optical axis 126 of the fisheye lens system 112 by distances in both axes (x offset, y offset) that is greater than 10% length of the image sensor along the respective axis. In the illustrated example, the center 128 of the image sensor 110 is offset relative to an optical axis 126 of the projected aperture/fisheye lens system 120, 112 by distances in both axes (x offset, y offset) that is about 20% or greater than the length of the image sensor 110 along the direction of the offset.

Figure 8:
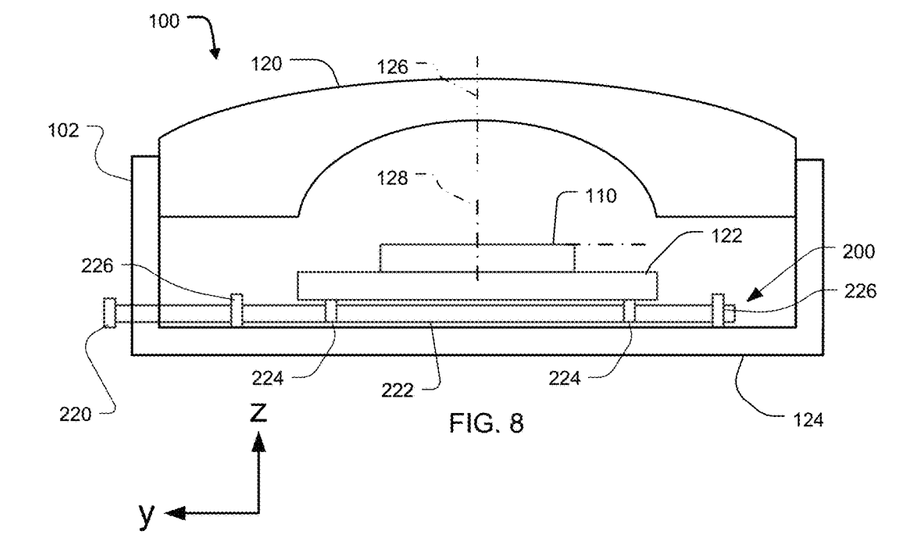
FIG. 8 is a schematic cross-sectional view of the fisheye security camera showing the image sensor mounted on a sensor offsetting mechanism.

FIG. 8 is a schematic cross-sectional view of the fisheye surveillance camera showing the image sensor 110 mounted on the sensor offsetting mechanism 200.

In the illustrated embodiment, the fisheye lens system 120, mounted within the housing 102, captures light from the surrounding environment. The fisheye lens system forms an image of this light onto the image sensor 110. Typically, this image sensor 110 is mounted on a circuit board 122, which is mounted to a base 124 of the fisheye camera 100.

In the illustrated embodiment, the sensor offsetting mechanism 200 is mechanically located between the sensor PCB 122 and the base 124. The offsetting mechanism 200 comprises a single axis stage system that is mounted to both the image sensor circuit board 122 and the base 124. Specifically, lead nuts 124 are mounted on the bottom face of the circuit board 122. These engage a lead screw 222. The screw mounts 226 in turn mount the lead screw 222 to the base 124. As result, when the operator, or the calibration system within the factory, turns this lead screw 222 at the offset adjustment screw head 220, the circuit board 122 and thus the image sensor 110 are moved along the y-axis to thereby move or offset the center 128 of the image sensor 110 relative to the optical axis 126 of the fisheye lens system 120.

Figure 9:
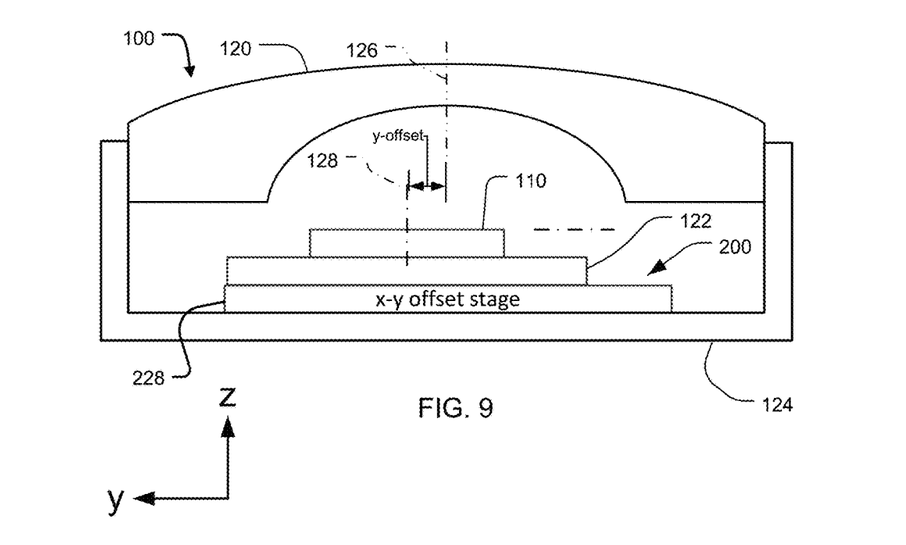
FIG. 9 is a schematic cross-sectional view of the fisheye security camera showing the image sensor mounted on a sensor offsetting mechanism according to a second embodiment.

FIG. 9 is a schematic cross-sectional view of the fisheye security camera showing the image sensor mounted on a sensor offsetting mechanism 200 according to a second embodiment. This embodiment includes an x-y axis offset stage 228. Specifically, this two axis stage is mounted mechanically between the image sensor circuit board 122 and the fisheye camera base 124. This allows the center 128 of the image sensor 110 to be adjusted in long both the x-axis and the y-axis relative to the optical axis 126 of the fisheye lens system 120.

Figure 10:
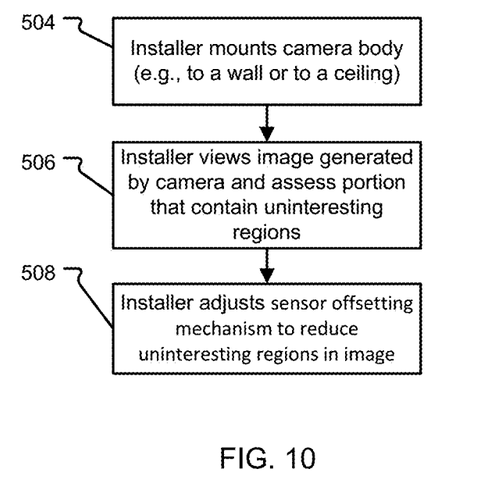
FIG. 10 is a method of installation and offset calibration.

FIG. 10 is a method of installation and offset calibration. It illustrates how the fisheye camera system can be adjusted in the field. Specifically, the installer first mounts the camera body to the wall or ceiling in step 504. Then, in step 506, the installer views the image generated by the camera 100 using, for example, a portable or surveillance system monitor. The installer assesses the portion of the image that may contain uninteresting regions, such as a view of the sky or the ceiling or an adjacent wall. Then, in step 508, the installer adjusts the sensor offsetting mechanism 200 at screw head 220 to reduce these uninteresting portions in the image.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wide angle surveillance camera, comprising:
    an image sensor for detecting images;
    a wide angle lens system for forming images on the image sensor; and
    an offsetting mechanism for enabling adjustment of offset between a center of the image sensor and an optical axis of the wide angle lens system by a distance that is greater than 10% of a length of the image sensor, the offsetting mechanism enabling mechanical adjustment of the offset between the image sensor and the wide angle lens system;
    wherein an area of a projected aperture of the wide angle lens system at the plane of the image sensor is larger than an area of the image sensor.

2. A camera as claimed in claim 1, wherein an area of a projected aperture of the wide angle lens system at the plane of the image sensor is 50% larger than an area of the image sensor.

3. A camera as claimed in claim 1, wherein an area of a projected aperture of the wide angle lens system at the plane of the image sensor is 100% larger than an area of the image sensor.

4. A camera as claimed in claim 1, wherein the offsetting mechanism offsets the center of the image sensor relative to an optical axis of the wide angle lens system along only one axis.

5. A camera as claimed in claim 1, wherein the offsetting mechanism offsets the center of the image sensor relative to an optical axis of the wide angle lens system along both axes of the plane of the image sensor.

6. A camera as claimed in claim 1, wherein the offsetting mechanism has the capability to offset the center of the image sensor relative to an optical axis of the wide angle lens system by a distance that is greater than 20% length of the image sensor.

7. A camera as claimed in claim 1, wherein the offsetting mechanism comprises a two dimensional stage for translating the image sensor on a base of the camera.

8. A camera as claimed in claim 1, wherein the offsetting mechanism comprises an adjustment that is accessible from an exterior of a body of the camera enabling an operator to adjust the offset.

9. A camera as claimed in claim 1, further comprising an indicium visible on the camera that indicates a direction that the image sensor is offset with respect to the wide angle lens system.

10. A method for installing a wide angle surveillance camera, comprising:
    installing the camera; and
    offsetting an image sensor relative to an optical axis of a wide angle lens system to reduce uninteresting portions within images generated by the camera by adjusting an offsetting mechanism for enabling adjustment of offset between the image sensor and the wide angle lens system wherein the center of the image sensor can he offset relative to an optical axis of the wide angle lens s -stem by a distance that is greater than 10% of a length of the image sensor by an offsetting mechanism for enabling mechanical adjustment of the offset between the image sensor and the wide angle lens system and an area of a proleued aperture of the wide angle lens system at the plane of the image sensor is larger than an area of the image sensor.

11. A method as claimed in claim 10, wherein the step of offsetting comprises offsetting a center of the image sensor relative to an optical axis of the wide angle lens system along only one axis.

12. A method as claimed in claim 10, wherein the step of offsetting comprises offsetting a center of the image sensor relative to an optical axis of the wide angle lens system along both axes of the plane of the image sensor.

13. A method as claimed in claim 10, wherein the step of offsetting comprising adjusting a sensor offsetting mechanism via an adjustment that is accessible from an exterior of a body of the camera.

14. A method for installing a wide angle surveillance camera, comprising:
    installing the camera; and
    adjusting a body offset direction indicium indicating direction that image sensor is offset to reduce uninteresting portions within images generated by the camera;
    wherein the center of the image sensor is offset relative to an optical axis of the wide angle lens system by a distance that is greater than 10% of a length of the image sensor by an offsetting mechanism for enabling mechanical adjustment of the offset between the image sensor and the wide angle lens system and an area of a projected aperture of the wide angle lens system at the plane of the image sensor is larger than an area of the image sensor.

15. A method as claimed in claim 14, further comprising viewing an image generated by the camera.

16. A wide angle surveillance camera, comprising:
    an image sensor for detecting images; and
    a wide angle lens system for forming images on the image sensor, wherein the center of the image sensor is offset relative to an optical axis of the wide angle lens system by a distance that is greater than 10% of a length of the image sensor by an offsetting mechanism for enabling mechanical adjustment of the offset between the image sensor and the wide angle lens system; and wherein an area of a projected aperture of the wide angle lens system at the plane of the image sensor is larger than an area of the image sensor.

17. A camera as claimed in claim 16, wherein the center of the image sensor is offset relative to an optical axis of the wide angle lens system by a distance that is greater than 20% length of the image sensor.

18. A camera as claimed in claim 16, wherein the image sensor is offset relative to an optical axis of the wide angle lens system in two dimensions of the plane of the sensor.

19. A camera as claimed in claim 16, wherein the image sensor is mounted to the offsetting mechanism, which is mounted to a base of the camera.

20. A camera as claimed in claim 19, wherein the offsetting mechanism comprises stage system that includes a lead nut and a lead screw.

21. A camera as claimed in claim 19, wherein the offsetting mechanism comprises x-y axis stage system enabling the image sensor to be adjusted along both an x-axis and a y-axis relative to an optical axis of the lens system.

* * * * *

UNITED STATES PATENT AND TRADEMARK OFFICE
CERTIFICATE OF CORRECTION

PATENT NO. : 10,044,932 B2
APPLICATION NO. : 14/683342
DATED : August 7, 2018
INVENTOR(S) : Walter A. Martin Page 1 of 1

It is certified that error appears in the above-identified patent and that said Letters Patent is hereby corrected as shown below:

In the Claims

In Claim 10, Column 8, Line 25, delete "he" and insert --be--.
In Claim 10, Column 8, Line 27, delete "s -stem" and insert --system--.
In Claim 10, Column 8, Line 31, delete "proleued" and insert --projected--.

Signed and Sealed this
Eighteenth Day of September, 2018

Andrei Iancu
*Director of the United States Patent and Trademark Office*